United States Patent
Hayano et al.

(10) Patent No.: US 7,608,671 B2
(45) Date of Patent: Oct. 27, 2009

(54) NORBORNENE RING-OPENED POLYMER HYDROGENATED PRODUCT AND PROCESS FOR PRODUCING SAME

(75) Inventors: Shigetaka Hayano, Tokyo (JP); Yasuo Tsunogae, Tokyo (JP)

(73) Assignee: Zeon Corporation, Tokyo (JP)

( * ) Notice: Subject to any disclaimer, the term of this patent is extended or adjusted under 35 U.S.C. 154(b) by 68 days.

(21) Appl. No.: 10/567,964

(22) PCT Filed: Aug. 12, 2004

(86) PCT No.: PCT/JP2004/011601

§ 371 (c)(1),
(2), (4) Date: Sep. 27, 2006

(87) PCT Pub. No.: WO2005/016990

PCT Pub. Date: Feb. 24, 2005

(65) Prior Publication Data

US 2007/0185290 A1    Aug. 9, 2007

(30) Foreign Application Priority Data

Aug. 13, 2003 (JP) .............................. 2003-293256

(51) Int. Cl.
C08F 32/08 (2006.01)
C08F 36/20 (2006.01)
C08F 8/04 (2006.01)
C08C 19/02 (2006.01)

(52) U.S. Cl. ...................... 525/338; 526/169; 526/281; 526/283; 526/336

(58) Field of Classification Search .................. 525/338; 526/169, 281, 283, 336
See application file for complete search history.

(56) References Cited

U.S. PATENT DOCUMENTS 5,194,534 A    3/1993    Bell
5,405,924 A    4/1995    Kelsey

FOREIGN PATENT DOCUMENTS

| EP | 0 534 388 A1 | 3/1993 |
|---|---|---|
| EP | 0534388 A1 | 3/1993 |
| EP | 1238996 A1 | 9/2002 |
| JP | 5-345817 A | 12/1993 |
| JP | 10-120768 A | 5/1998 |
| JP | 11-080325 A | 3/1999 |
| JP | 2002-180325 * | 6/2002 |
| JP | 2002-180325 A | 6/2002 |
| JP | 2002-249553 A | 9/2002 |

OTHER PUBLICATIONS

Polymer Preprints, Japan (English Edition) vol. 51, No. 2 (2002) E 731.
Organometallics 1998, vol. 17, pp. 4183-4195.
Hayano et al., "Stereospecific Ring-Opening Metathesis Polymerization of Cycloolefins Using Novel Molybdenum and Tungsten Complexes Having Biphenoalte Ligands. Development of Crystalline Hydrogenated Poly (endo-dicyclopentadiene) and Poly (norbornene)", Macromolecules, vol. 36, pp. 7422-7431, XP002481951, Aug. 29, 2003.

* cited by examiner

Primary Examiner—Roberto Rábago
(74) Attorney, Agent, or Firm—Birch, Stewart, Kolasch & Birch LLP

(57) ABSTRACT

A norbornene ring-opened polymer hydrogenated product having a syndiotactic structure and a process for producing the same are disclosed. The ring-opened polymer hydrogenated product contains a repeating unit originating from a polycyclic norbornene monomer with three or more rings in the polymer repeating units, having a weight average molecular weight of 500 to 1,000,000, and having a racemo diad proportion of 51% or more. The process comprises a step of polymerizing a polycyclic norbornene monomer having three or more rings by solution polymerization using a group 6 transition metal compound with a hydroxyl group-containing aryloxy group or the like bonded thereto as a polymerization catalyst to obtain a ring-opened polymer and a step of hydrogenating double bonds in the main chain of the ring-opened polymer.

7 Claims, No Drawings

NORBORNENE RING-OPENED POLYMER HYDROGENATED PRODUCT AND PROCESS FOR PRODUCING SAME

TECHNICAL FIELD

The present invention relates to a norbornene ring-opened polymer hydrogenated product having a syndiotactic structure and to a process for producing the same.

BACKGROUND ART

Norbornene ring-opened polymer hydrogenated products have been conventionally known to have excellent transparency, heat resistance, low birefringence, formability, and the like, and their use as materials for optical disks and optical lenses has been proposed. Since these polymers have other excellent properties such as low dielecticity and chemical resistance, their utilization is expanding to include fields other than optical goods. The norbornene ring-opened polymers and the hydrogenated products used here are usually atactic amorphous polymers in terms of their structure. However, since further improvement in mechanical hardness, solvent resistance, heat resistance, and other properties is desired when using these polymers for applications other than optical use, stereoregular polymerization of norbornene monomers is proposed as a countermeasure.

For example, Organometalics, Vol. 17, pp. 4183-4195 (1998) describes tacticity of a norbornene ring-opened polymer hydrogenated product obtained by the polymerization using a tantalum complex as a polymerization catalyst. Preprint of the Society of Polymer Science, Japan, Vol. 8, pp. 1629-1630 (2002) describes tacticity of a dicyclopentadiene ring-opened polymer hydrogenated product obtained by the polymerization using a tungsten or molybdenum complex with two coordinated biphenoxy groups as a polymerization catalyst. However, the polymers described in these documents are isotactic polymers with a meso diad percentage of 50% or more.

JP-05-345817-A discloses a polymerization catalyst composition consisting of a tungsten compound and an activator for polymerization of non-conjugated polycyclic cycloolefin monomers such as dicyclopentadiene, cyclopentadiene trimer, and the like, in which the tungsten compound is a tungsten-imide compound represented by the formula $W(Nr^a)X^a{}_{4-x}(Or^b)_x.L'_y$, wherein x is an integer of 0-4, y is 0 or 1, $r^a$ and $r^b$ are respectively an alkyl, phenyl, phenyl-substituted phenyl, or phenylalkyl and so on, $X^a$ is Cl or Br, and L' represents a donor ligand. However, the polymerization method described in this document is a bulk polymerization method to produce crosslinked polymers which cannot be hydrogenated. In addition, the polymers obtained are supposed to have no stereoregularity.

JP-11-80325-A discloses a ring-opening metathesis polymerization technology of cycloolefins in the presence of a polymerization catalyst consisting of an organic transition metal complex shown by the following formula and an organometal compound,

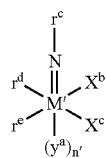

wherein $r^c$ represents alkyl or aryl, $r^d$ and $r^e$ individually represent an alkoxy, aryloxy, alkylamide, or arylamide, $X^b$ and $X^c$ individually represent a halogen, alkyl, aryl, or alkylsilyl, $y^a$ represents a phosphine, ether, or amine, N is nitrogen, M' is a transition metal selected from group 6 of the periodic table, and n' is an integer of 0-2.

However, it was difficult to obtain a ring-opened polymer and crystalline ring-opened polymer hydrogenated product having a syndiotactic structure by the ring-opening polymerization of the polycyclic norbornene monomers with three or more rings in the presence of the polymerization catalyst described in this document.

DISCLOSURE OF THE INVENTION

The present invention has been completed in view of the above situation in the prior art technology and has an object of providing a hydrogenated product of a ring-opened polymer of norbornene monomers with three or more rings having a syndiotactic structure and a process for producing the same.

As a result of extensive studies to solve the above problems, the present inventors have found that if a polycyclic norbornene monomer with three or more rings such as dicyclopentadiene is polymerized using a group 6 transition metal compound with a specific structure as a polymerization catalyst and the resulting polymer is hydrogenated, the obtained ring-opened polymer hydrogenated product has a syndiotactic structure. The present inventors have also found that the ring-opened polymer hydrogenated product has high heat resistance. These findings have led to the completion of the present invention.

Accordingly, the present invention provides following ring-opened polymer hydrogenated products (1) to (6).

(1) A ring-opened polymer hydrogenated product containing a repeating unit originating from a polycyclic norbornene monomer with three or more rings in the polymer repeating units, having a weight average molecular weight of 500 to 1,000,000, and having a racemo diad proportion of 51% or more.

(2) The ring-opened polymer hydrogenated product according to (1), wherein the racemo diads proportion is 70% or more.

(3) The ring-opened polymer hydrogenated product according to (1), wherein the content of the repeating unit originating from a polycyclic norbornene monomer with three or more rings is 50 mol % or more.

(4) The ring-opened polymer hydrogenated product according to (1), wherein the repeating unit originating from a polycyclic norbornene monomer with three or more rings is a repeating unit originating from dicyclopentadiene.

(5) The ring-opened polymer hydrogenated product according to (1) which is a crystalline polymer.

(6) The ring-opened polymer hydrogenated product according to (5), which is a polymer having a melting point of 150° C. or more.

The present invention further provides the following processes (7) and (8) for producing the ring-opened polymer hydrogenated product of the present invention.

(7) A process for producing the ring-opened polymer hydrogenated product according to claim 1, comprising a step of polymerizing a polycyclic norbornene monomer having three or more rings by solution polymerization using a group 6 transition metal compound with a hydroxyl group-containing aryloxy group or a hydroxyl group-containing alkoxyl group bonded thereto as a polymerization catalyst to obtain a ring-opened polymer and a step of hydrogenating double bonds in the main chain of the ring-opened polymer.

(8) The process according to (7), wherein the group 6 transition metal compound with a hydroxyl group-containing aryloxy group or a hydroxyl group-containing alkoxyl group bonded thereto is a compound shown by the following formula (a), $$M(NR^a)X_3Y \cdot L_b \quad (a)$$

wherein M is a transition metal of group 6 of the periodic table, $R^a$ is a substituted or unsubstituted phenyl group with a substituent at any of 3, 4, or 5 position or a group represented by —$CH_2R^d$, wherein $R^d$ indicates a hydrogen atom, a substituted or unsubstituted alkyl group, or a substituted or unsubstituted aryl group, X represents a halogen atom, alkyl group, aryl group, or alkylsilyl group, Y is a hydroxyl group-containing aryloxy group or a hydroxyl group-containing alkoxyl group, L is an electron donating neutral ligand, and b is an integer of 0 to 2.

The present invention further provides the following process (9) for producing the ring-opened polymer hydrogenated product of the present invention.

(9) A process for producing a ring-opened polymer hydrogenated product according to (1) above, comprising a step of polymerizing a polycyclic norbornene monomer having three or more rings by solution polymerization using a group 6 transition metal compound shown by the following formula (b) as a polymerization catalyst to obtain a ring-opened polymer and a step of hydrogenating double bonds in the main chain of the ring-opened polymer, $$M(NR^b)X_{4-a}(OR^c)_a \cdot L_b \quad (b)$$

wherein $R^b$ is a substituted or unsubstituted phenyl group with a substituent at any of 3, 4, or 5 position or a group represented by —$CH_2R^d$, wherein $R^d$ indicates a hydrogen atom, a substituted or unsubstituted alkyl group, or a substituted or unsubstituted aryl group, X represents a halogen atom, alkyl group, aryl group, or alkylsilyl group, $R^c$ is a substituted or unsubstituted alkyl group or a substituted or unsubstituted aryl group, L is an electron donating neutral ligand, and a is 0 or 1, and b is an integer of 0 to 2.

BEST MODE FOR CARRYING OUT THE PRESENT INVENTION

The ring-opened polymer hydrogenated product and the process for producing the same of the present invention will be described in detail.

<Norbornene Ring-Opened Polymer Hydrogenated Product>

The norbornene ring-opened polymer hydrogenated product of the present invention contains a repeating unit originating from a polycyclic norbornene monomer having three or more rings.

In the present invention, the repeating unit originating from polycyclic norbornene monomer having three or more rings is a repeating unit obtainable by ring-opened polymerization of a norbornene monomer having a norbornene ring and one or more rings condensed with the norbornene ring, followed by hydrogenation of main chain double bonds in the ring-opened polymer. As specific examples, repeating units of the following formula (1) or (2) can be given,

(1)

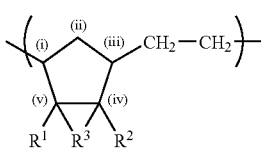

wherein $R^1$ and $R^2$ individually represent a hydrogen atom, a halogen atom, a substituted or unsubstituted hydrocarbon group with 1-20 carbon atoms, or a substituent containing a silicon atom, oxygen atom, or nitrogen atom, or $R^1$ and $R^2$ may bond together to form a ring, and $R^3$ herein represents a substituted or unsubstituted divalent hydrocarbon group having 1-20 carbon atoms; or

(2)

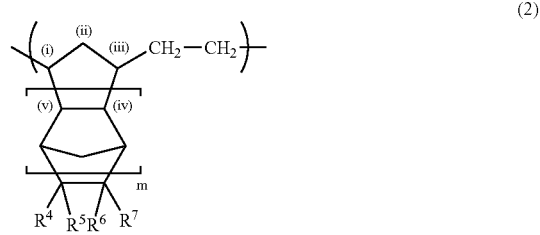

wherein $R^4$ to $R^7$ individually represent a hydrogen atom, a halogen atom, a substituted or unsubstituted hydrocarbon group with 1-20 carbon atoms, or a substituent containing a silicon atom, oxygen atom, or nitrogen atom, or $R^4$ and $R^6$ may bond together to form a ring, and m is 1 or 2.

The proportion of the repeating unit originating from a polycyclic norbornene monomer with three or more rings in all repeating units in the ring-opened polymer hydrogenated product of the present invention is usually 10 mol % or more, preferably 50 mol % or more, more preferably 70 mol % or more, and most preferably 90 mol % or more. The proportion of the repeating unit originating from a polycyclic norbornene monomer with three or more rings ensures production of a ring-opened polymer hydrogenated product with excellent heat resistance.

The polystyrene-reduced weight average molecular weight (Mw) of the ring-opened polymer hydrogenated product of the present invention determined by gel permeation chromatography (GPC) is 500-1,000,000, preferably 1,000-600,000, and more preferably 5,000-400,000. If the Mw is too low, the mechanical strength may be poor; if too high, forming is difficult.

Since the carbon atoms indicated by (i) and (iii) in the above formulas (1) or (2) are asymmetric, the ring-opened polymer hydrogenated product of the present invention has stereoregularity (tacticity).

The ring-opened polymer hydrogenated product of the present invention is a syndiotactic polymer having a racemo diad content of 51% or more, preferably 60% or more, and more preferably 70% or more.

The proportion of meso diads and racemo diads can be determined by $^{13}$C-NMR spectrum analysis.

More specifically, the proportion can be determined by measuring the spectrum of at least one carbon atom indicated by (i) to (v) in the above formulas (1) and (2).

The measuring method differs according to the type of polymer. In the case of the ring-opened polymer hydrogenated product of dicyclopentadiene, for example, $^{13}$C-NMR spectrum is measured at 150° C. using ortho-dichlorobenzene-$d_4$ as a solvent to determine the proportion of racemo diads from the ratio of the 43.35 ppm signal originating from meso diads to the 43.43 ppm signal originating from racemo diads.

The ring-opened polymer hydrogenated product of the present invention is normally crystalline and has a melting point (Tm). The melting point can be determined by the heat absorption peak due to melting of the crystal component of the polymer when measured using a differential scanning calorimeter. The ring-opened polymer hydrogenated product of the present invention usually has a melting point of 150° C. or higher, and preferably 200-400° C.

<Process for Producing Ring-Opened Polymer Hydrogenated Product>

The process for producing the ring-opened polymer hydrogenated product of the present invention is one of the methods for producing the above-described ring-opened polymer hydrogenated product of the present invention and comprises polymerizing a polycyclic norbornene monomer having three or more rings using (a) a polymerization catalyst containing a group 6 transition metal compound with a hydroxyl group-containing aryloxy group or a hydroxyl group-containing alkoxyl group bonded thereto (hereinafter referred to from time to time as "polymerization catalyst (I)") or (b) a polymerization catalyst containing a group 6 transition metal compound shown by the above formula (b) (hereinafter referred to from time to time as "polymerization catalyst (II)"), and hydrogenating double bonds in the main chain of the ring-opened polymer.

<Monomer>

As monomers which can be used in the present invention, a polycyclic norbornene monomer with three or more rings (hereinafter referred to from time to time as "polycyclic norbornene monomer (α)"), a combination of two or more polycyclic norbornene monomers (α), or a combination of the polycyclic norbornene monomers (α) and other copolymerizable monomers can be given.

The polycyclic norbornene monomer with three or more rings is a norbornene monomer having a norbornene ring and one or more rings condensed with the norbornene ring. As specific examples, monomers shown by the following formula (3) or (4) can be given.

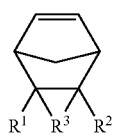

(3)

wherein $R^1$ to $R^3$ are the same as defined for the formula (1), or

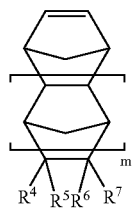

(4)

wherein $R^4$ to $R^7$ and m are the same as defined for formula (2).

As specific examples of the monomer shown by the formula (3), dicyclopentadiene, methyldicyclopentadiene, tricyclo[5.2.1.0$^{2,6}$]deca-8-ene, and the like can be given. In addition, norbornene derivatives having an aromatic ring such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), tetracyclo[10.2.1.0$^{2,11}$.0$^{4,9}$]pentadeca-4,6,8,13-tetraene (also referred to as 1,4-methano-1,4,4a,9,9a,10-hexahydroanthracene), and the like can be given.

As the monomer shown by the formula (4), tetracyclododecenes with m=1 and hexacycloheptadecenes with m=2 can be given.

The following compounds can be given as specific examples of tetracyclododecenes. Tetracyclododecenes with no substituent or substituted with an alkyl group such as tetracyclododecene, 8-methyltetracyclododecene, 8-ethyltetracyclododecene, 8-cyclohexyltetracyclododecene, and 8-cyclopentyltetracyclododecene; tetracyclododecenes having a double bond outside the ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes having an aromatic ring such as 8-phenyltetracyclododecene; tetracyclododecenes having a substituent containing an oxygen atom such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; tetracyclododecenes having a substituent containing a nitrogen atom such as 8-cyanotetracyclododecene and tetracyclododecene-8,9-dicarboxylic acid imide; tetracyclododecenes having a substituent containing a halogen atom such as 8-chlorotetracyclododecene; and tetracyclododecenes having a substituent containing a silicon atom such as 8-trimethoxysilyltetracyclododecene.

The following compounds can be given as specific examples of hexacycloheptadecenes. Hexacycloheptadecenes with no substituent or substituted with an alkyl group such as hexacycloheptadecene, 12-methylhexacycloheptadecene, 12-ethylhexacycloheptadecene, 12-cyclohexylhexacycloheptadecene, and 12-cyclopentylhexacycloheptadecene; hexacycloheptadecenes having a double bond outside the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes having an aromatic ring such as 12-phenylhexacycloheptadecene; hexacycloheptadecenes having a substituent containing an oxygen atom such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; hexacycloheptadecenes having a substituent containing a nitrogen atom such as 12-cyanohexacycloheptadecene and hexacycloheptadecene-12,13-dicarboxylic acid imide; hexacycloheptadecenes having a substituent containing a halogen atom such as 12-chlorohexacycloheptadecene; and hexacycloheptadecenes having a substituent containing a silicon atom such as 12-trimethoxysilylhexacycloheptadecene.

Because the stereoregularity during the polymerization reaction depends upon the steric structure of the sites relating to the ring-opened reaction of monomers in the process of the present invention, a ring-opened polymer hydrogenated product with a proportion of racemo diads of 51% or more can be obtained by using any of the above-mentioned monomers.

Of the above-mentioned monomers, monomers shown by the above formula (3) or tetracyclododecenes with m=1 in the formula (4) are preferable due to their capability of producing highly crystalline ring-opened polymer hydrogenated product. Preferable monomers are dicyclopentadiene, tricyclo[5.2.1.0$^{2,6}$]deca-8-ene, tetracyclo[9.2.1.0$^{2,10}$.0$^{3,8}$]tetradeca-3,5,7,12-tetraene, tetracyclo[10.2.1.0$^{2,11}$.0$^{4,9}$]pentadeca-4,6,8,13-tetraene, tetracyclododecene, and 8-methyltetracyclododecene, with dicyclopentadiene being particularly preferable.

The amount of the polycyclic norbornene monomers (α) used in the process of the present invention is usually 10 mol % or more, preferably 50 mol % or more, more preferably 70 mol % or more, and particularly preferably 90 mol % or more of the total amount of monomers.

The above polycyclic norbornene monomers (α) include endo-isomer and exo-isomer. The monomers used in the present invention may be a mixture of these isomers. In order to increase crystallinity, it is desirable that the proportion of either one of the isomers in the mixture be higher than the other. Specifically, the amount of either one of the isomers is preferably 70% or more, and particularly preferably 80% or more. Since the polymer can crystallize to a high degree by increasing the proportion of either one of the isomers, it is possible to increase heat resistance of the polymer.

As monomers copolymerizable with the above-mentioned polycyclic norbornene monomer (α), cycloolefins (β) can be given. As the cycloolefins (β), norbornene monomers having no ring condensable with a norbornene ring in the molecule, monoclyclic cycloolefins, and the like can be given.

As specific examples of the norbornene monomers having no ring condensable with a norbornene ring in the molecule, norbornenes with no substituent or substituted with an alkyl group such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes having an alkenyl group such as 5-ethylidenenorbornene, 5-vinylnorbornene, 5-propenylnorbornene, 5-cyclohexenylnorbornene, and 5-cyclopentenylnorbornene; norbornenes having an aromatic ring such as 5-phenylnorbornene; norbornenes having a polar group with an oxygen atom such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxyisopropylnorbornene, 5,6-dicarboxynorbornene, and 5-methoxycarbonyl-6-carboxynorbornene; norbornenes having a polar group with a nitrogen atom such as 5-cyanonorbornene; and the like can be given.

The monocyclic cycloolefins are monocyclic monoolefins or diolefins having 4-20 carbon atoms or their derivatives, preferably monocyclic monoolefins or diolefins having 4-10 carbon atoms or their derivatives.

As specific examples of the monocyclic monoolefins or diolefins, monocyclic monoolefins such as cyclobutene, cyclopentene, methylcyclopentene, cyclohexene, methylcyclohexene, cycloheptene, and cyclooctene; monocyclic diolefins such as cyclohexadiene, methylcyclohexadiene, cyclooctadiene, methylcyclooctadiene, and phenylcyclooctadiene; and the like can be given.

<Polymerization Catalyst>

The above-mentioned polymerization catalyst (I) or polymerization catalyst (II) is used as a polymerization catalyst in the present invention.

The polymerization catalyst (I) comprises a group 6 transition metal compound with a hydroxyl group-containing aryloxy group or a hydroxyl group-containing alkoxyl group bonded thereto (hereinafter referred to from time to time as "group 6 transition metal compound (i)").

As the metal in the group 6 transition metal compound (i), metals in the group 6 of the periodic table such as chromium, molybdenum, tungsten, and the like can be given. Of these, molybdenum and tungsten are preferable, with tungsten being particularly preferable.

The group 6 transition metal compound (i) is a compound having a structure shown by the following formula (5),

wherein M is a group 6 transition metal and R$^8$ represents a divalent hydrocarbon group which may have a substituent.

Specific examples of R$^8$ include a divalent aliphatic hydrocarbon group with 1-20 carbon atoms, divalent alicyclic hydrocarbon group with 3-20 carbon atoms, divalent aromatic hydrocarbon group with 6-50 carbon atoms, and hydrocarbon groups in which these groups are bonded together.

As the group 6 transition metal compound (i), a compound shown by the formula (6) in which the above-mentioned hydroxyl group is coordinated with the group 6 transition metal compound as a neutral ligand is preferable, with a compound shown by the formula (7) being more preferable.

wherein M and R$^8$ are the same as defined above.

In the formula (7), M and R$^8$ are the same as defined above.

Z indicates an oxygen atom or a group shown by the formula NR$^9$, with NR$^9$ being preferable. R$^9$ represents a substituted or unsubstituted hydrocarbon group. As specific examples of R$^9$, a linear or branched alkyl group having 1-20 carbon atoms, cycloalkyl group having 3-20 carbon atoms, substituted or unsubstituted aryl group having 6-24 carbon atoms, and the like can be given.

X represents a halogen atom, hydrocarbon group, alkylsilyl group, alkoxyl group, or aryloxy group. Two or more X groups, if present, may be either the same or different, or may bond together.

As the halogen atom represented by X, a chlorine atom, bromine atom, and iodine atom can be given. Examples of the hydrocarbon group include a methyl group, ethyl group, propyl group, isopropyl group, butyl group, isobutyl group, t-butyl group, pentyl group, neopentyl group, benzyl group, neophyl group, phenyl group, naphthyl group, and the like. As examples of the alkylsilyl group, trimethylsilyl group, triethylsilyl group, t-butyldimethylsilyl group, and the like can be given. Examples of the alkoxyl group include a methoxy group, ethoxy group, propoxy group, isopropoxy group, butoxy group, isobutoxy group, t-butoxy group, and the like. As examples of the aryloxy group, phenoxy group, 2,6-dimethylphenoxy group, 2,6-diisopropylphenoxy group, and the like can be given. As examples of the group in which two or more X groups are bonded, biphenoxy group, phenyldioxy group, and the like can be given.

p indicates 1 or 2, with 1 being preferable.

L is an electron donating neutral ligand. As examples of the electron donating neutral ligand, electron donating compounds containing an atom in the group 14 or 15 of the periodic table can be given. Specific examples include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; amines such as trimethylamine, triethylamine, pyridine, and lutidine; and the like. Of these, ether is preferable.

b is an integer of 0 to 2. When b is 2, L may be either the same or different.

Among the compounds of the formula (7), preferable compounds are those shown by the following formulas (8) to (10).

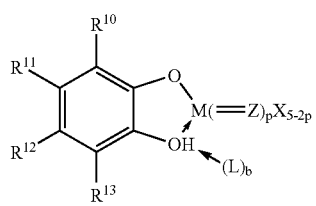

(8)

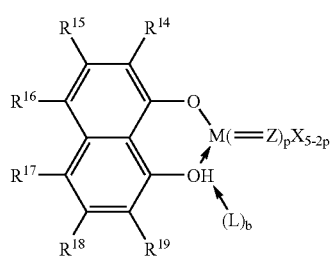

(9)

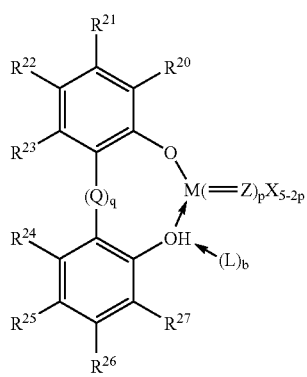

(10)

In the formulas (8) to (10), M, Z, X, L, b, and p are the same as defined above.

$R^{10}$ to $R^{27}$ individually represent a hydrogen atom, hydrocarbon group having 1-20 carbon atoms, or a substituent containing a halogen atom, silicon atom, oxygen atom, or nitrogen atom, provided that groups $R^{10}$ to $R^{27}$ bonding with adjacent carbon atoms may bond together to form a ring.

Q is an oxygen atom, sulfur atom, and a group selected from the formulas (11) to (14).

(11)

(12)

(13)

(14)

In the formulas (11) to (14), $R^{28}$ to $R^{32}$ individually represent a hydrogen atom or a hydrocarbon group having 1-6 carbon atoms.

As specific examples of $R^{10}$ to $R^{27}$, a methyl group, ethyl group, propyl group, isopropyl group, butyl group, t-butyl group, phenyl group, and the like can be given.

Groups among $R^{10}$-$R^{27}$ which respectively bond to adjacent carbon atoms may bond together to form a ring. As examples of the compound forming a ring by bonding of groups which respectively bond to adjacent carbon atoms, a compound forming a naphthalene ring by bonding of $R^{11}$ and $R^{12}$, a compound forming an anthracene ring by bonding of $R^{14}$ and $R^{15}$ or $R^{18}$ and $R^{19}$, a compound forming a phenanthrene ring by bonding of $R^{15}$ and $R^{16}$ or $R^{17}$ and $R^{18}$, a compound forming a naphthalene ring by bonding of $R^{22}$ and $R^{23}$ and/or $R^{24}$ and $R^{25}$, and the like can be given.

q is 0 or 1.

Of these, the group 6 transition metal compound (i) of the following formula (a) is particularly preferable.

$$M(NR^a)X_3Y.L_b \qquad (a)$$

In the formula (a), M, X, L, and b are the same as defined above.

$R^a$ is a unsubstituted or substituted phenyl group with a substituent at any of 3, 4, or 5 position or a group represented by —$CH_2R^d$.

As examples of the substituent for the phenyl group having a substituent at any of 3, 4, or 5 positions, an alkyl group such as a methyl group, ethyl group, propyl group, isopropyl group, n-butyl group, sec-butyl group, isobutyl group, and t-butyl group; a cycloalkyl group such as a cyclopropyl group, cyclopentyl group, and cyclohexyl group; a halogen atom such as a fluorine atom, chlorine atom, and bromine atom; an alkoxyl group such as a methoxy group, ethoxy group, propoxy group, isopropoxy group, butoxy group, and t-butoxy group; and the like can be given.

As examples of the unsubstituted or substituted phenyl group with a substituent at any of 3, 4, or 5 positions, a phenyl group; a mono-substituted phenyl group such as a 4-methylphenyl group, 4-chlorophenyl group, 3-methoxyphenyl group, 4-cyclohexylphenyl group, and 4-methoxyphenyl group; a di-substituted phenyl group such as a 3,5-dimethylphenyl group, 3,5-dichlorophenyl group, 3,4-dimethylphenyl group, and 3,5-dimethoxyphenyl group; a tri-substituted phenyl group such as 3,4,5-trimethylphenyl group and 3,4,5-trichlorophenyl group; and the like can be given. A substituted or unsubstituted 2-naphtyl group such as a 2-naphthyl group, 3-methyl-2-naphthyl group, 4-methyl-2-naphthyl group, and the like can also be given.

$R^d$ in the —CH$_2$R$^d$ group is a hydrogen atom, a substituted or unsubstituted alkyl group, or a substituted or unsubstituted aryl group, with a substituted or unsubstituted alkyl group being preferable.

Although there are no specific limitations to the number of carbon atoms possessed by the alkyl group which may contain a substituent represented by $R^d$, the number of carbon atoms is usually 1-20, and preferably 1-10. These alkyl groups may be either linear or branched. As examples of the substituent for the alkyl group which may contain a substituent represented by $R^d$, a phenyl group; a substituted phenyl group such as 4-methylphenyl group; an alkoxyl group such as a methoxy group and ethoxy group; and the like can be given.

The aryl group which may contain a substituent represented by $R^d$ is preferably an aryl group having 6-20 carbon atoms. Specific examples include a phenyl group, 1-naphthyl group, 2-naphthyl group, and the like. As examples of the substituent for the aryl group which may contain a substituent represented by $R^d$, the groups mentioned as the substituent of the phenyl group having a substituent at any of 3, 4, or 5 positions represented by $R^a$ can be given.

Y is the aforesaid hydroxyl group-containing aryloxy group or the hydroxyl group-containing alkoxyl group.

The above-mentioned group 6 transition metal compound (i) can be obtained by mixing a halide, oxyhalide, dioxyhalide, imidehalide, diimidehalide, or imideoxyhalide of a group 6 transition metal, a diol compound, and an electron donating neutral ligand (L). More specifically, the group 6 transition metal compound (i) can be prepared by the methods described in the Journal of American Chemical Society, 1993, Vol. 115, pp. 7916-7917; Polyhedron, 1992, Vol. 11, pp. 2039-2044; Polyhedron, 1995, Vol. 14, pp. 3255-3271; and the like.

The polymerization catalyst (II) contains a compound shown by the formula (b) (hereinafter referred to from time to time as "group 6 transition metal compound (ii)") as a main component.

$$M(NR^b)X_{4-a}(OR^c)_a \cdot L_b \qquad (b)$$

In the formula (b), M, X, L, and b are the same as defined above.

$R^b$ is a substituted or unsubstituted phenyl group with a substituent at any of 3, 4, or 5 positions or a group represented by —CH$_2$R$^d$.

The phenyl group which may have a substituent at any of 3, 4, or 5 positions and the group —CH$_2$R$^d$ represented by $R^b$ are respectively the same as the above-mentioned phenyl groups which may have a substituent at any of 3, 4, or 5 positions and the group —CH$_2$R$^d$ represented by $R^a$.

a is 0 or 1.

$R^c$ is a substituted or unsubstituted alkyl group or a substituted or unsubstituted aryl group. Although there are no specific limitations to the number of carbon atoms possessed by the alkyl group which may contain a substituent represented by $R^c$, the number of carbon atoms is usually 1-20, and preferably 1-10.

As examples of the substituent for the alkyl group which may contain a substituent represented by $R^c$, a phenyl group; a substituted phenyl group such as 4-methylphenyl group; an alkoxyl group such as a methoxy group and ethoxy group; and the like can be given. As examples of the aryl group which may contain a substituent represented by $R^c$, the groups mentioned as the aryl group which may have a substituent represented by $R^d$ can be given.

Specific examples of preferable group 6 transition metal compounds (ii) include:

compounds of the above formula (ii) in which $R^b$ is a phenyl group which may have a substituent at any of 3, 4, or 5 positions and a is 1, such as tungsten (phenylimide)(t-butoxide)trichloride, tungsten (4-methylphenylimide)(t-butoxide)trichloride, tungsten (3,5-dichlorophenylimide)(t-butoxide)trichloride, tungsten (phenylimide)(phenoxide)trichloride, tungsten (4-methylphenylimide)(phenoxide)trichloride, and tungsten (3,5-dichlorophenylimide)(phenoxide)trichloride; compounds of the above formula (ii) in which $R^b$ is a phenyl group which may have a substituent at any of 3, 4, or 5 positions and a is 0, such as tungsten (phenylimide)tetrachloride diethyl ether, tungsten (2,6-dichlorophenylimide)tetrachloride diethyl ether, tungsten (2,4-dichlorophenylimide) tetrachloride diethyl ether, tungsten (2,6-dibromophenylimide)tetrachloride diethyl ether, tungsten (2,4-dibromophenylimide)tetrachloride diethyl ether; tungsten (2,6-dimethylphenylimide)tetrachloride diethyl ether, tungsten (2-methylphenylimide)tetrachloride diethyl ether, tungsten {2-(trifluoromethyl)phenylimide}tetrachloride diethyl ether, tungsten (phenylimide)tetrachloride diethyl ether, tungsten (4-methylphenylimide)tetrachloride diethyl ether, tungsten (3,5-dichlorophenylimide)tetrachloride diethyl ether, and tungsten (3,4,5-trimethylphenylimide)tetrachloride diethyl ether; compounds of the above formula (ii) in which $R^b$ is a group shown by the formula —CH$_2$R$^d$ and a is 1, such as tungsten (n-butylimide)(t-butoxide)trichloride, tungsten (ethylimide) {(t-butoxide)}trichloride, tungsten (n-propylimide)(t-butoxide)trichloride, tungsten (n-hexylimide)(ethoxide)trichloride, tungsten (n-hexylimide)(phenoxide)tetrachloride, tungsten (2-methylpropylimide)(phenoxide)trichloride, and tungsten (benzylimide)(t-butoxide)trichloride; compounds of the above formula (ii) in which $R^b$ is a group shown by the formula —CH$_2$R$^d$ and a is 0, such as tungsten (n-butylimide)tetrachloride tetrahydrofuran, tungsten (ethylimide)tetrachloride, tungsten (n-propylimide)tetrachloride, tungsten (n-hexylimide)tetrachloride, tungsten (n-hexylimide)tetrachloride diethyl ether, tungsten (2-methylpropylimide)tetrachloride diethyl ether, tungsten (benzylimide)tetrachloride diethyl ether; and the like. The group 6 transition metal compound (ii) usable in the present invention is not limited to the compounds listed above.

The above-mentioned group 6 transition metal compound (ii) can be obtained by, for example, mixing an oxyhalide of a group 6 transition metal, a phenyl isocyanate which may have a substituent at any of 3, 4, or 5 positions, a mono-substituted methyl isocyanate, an electron donating neutral ligand (L), and, optionally, an alcohol, metal alkoxide, or metal aryloxide. The method described in JP-A-05-345817, for example, can be used for the production.

Either the group 6 transition metal compound (ii) that has been purified and isolated by crystallization and other means or a reaction solution obtained by the synthesis of the group 6 transition metal compound (ii) before purification may be used as the polymerization catalyst. Specifically, a reaction solution obtained by mixing and reacting an oxyhalide of a group 6 transition metal, an isocyanate compound, an electron donating neutral ligand (L), and, optionally, an alcohol, metal alkoxide, or metal aryloxide may be used as the polymerization catalyst. Alternatively, it is possible to use a reaction solution obtained by mixing and reacting an oxyhalide compound which is obtained by reacting a group 6 transition metal halide with an oxylaing agent (e.g. hexamethyldisiloxane), an isocyanate compound, an electron donating neutral ligand (L), and, optionally, an alcohol, metal alkoxide, or metal aryloxide.

In the process of the present invention, the above-mentioned monomers are polymerized after being mixed with the above-mentioned polymerization catalyst (I) or (II) as a metathesis polymerization catalyst. The ratio of the polymerization catalyst to the monomers, i.e. the molar ratio of the group 6 transition metal compound (i) or (ii) to the monomers, is usually from 1:100 to 1:2,000,000, preferably from 1:500 to 1:1,000,000, and more preferably from 1:1,000 to 1:500,000. If the amount of catalyst is too great, it may be difficult to remove the catalyst; if too small, sufficient polymerization activity cannot be obtained.

In the process of the present invention, the polymerization activity can be increased by using an organometal reducing agent together with the polymerization catalyst (I) or (II). As the organometal reducing agent, an organic compound of a metal in the groups 1, 2, 12, 13, or 14 of the periodic table containing a hydrocarbon group having 1-20 carbon atoms can be given as an example. Of these, organolithium, organomagnesium, organozinc, organoaluminum, and organotin are preferable, with organoaluminum and organotin being particularly preferable. As examples of the organolithium, n-butyllithium, methyllithium, phenyllithium, and the like can be given. As examples of the organomagnesium, butylethylmagnesium, butyloctylmagnesium, dihexylmagnesium, ethylmagnesium chloride, n-butylmagnesium chloride, allylmagnesium bromide, and the like can be given. As examples of the organozinc, dimethylzinc, diethylzinc, diphenylzinc, and the like can be given. As examples of the organoaluminum, trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like can be given. As examples of the organotin, tetramethyltin, tetra(n-butyl)tin, tetraphenyltin, and the like can be given. The amount of the organometal reducing agent used to the amount of the group 6 transition metal compound, in terms of the molar ratio, is preferably from 0.1 to 100, more preferably from 0.2 to 50, and particularly preferably from 0.5 to 20. If the amount of the organometal reducing agent is too small, the polymerization activity is not improved; if too large, side reactions easily occur.

<Solvent>

In the present invention, the polymerization reaction is carried out in an organic solvent. The organic solvent used is not specifically limited, insofar as the solvent can dissolve or disperse the polymer and hydrogenated product of the polymer under prescribed conditions and does not hinder the polymerization and hydrogenation.

The following compounds can be given as specific examples of the organic solvent: aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogenated aliphatic hydrocarbons such as dichloromethane, chloroform, and 1,2-dichloroethane; halogenated aromatic hydrocarbons such as chlorobenzene and dichlorobenzene; nitrogen-containing hydrocarbon solvents such as nitromethane, nitrobenzene, and acetonitrile; and ethers such as diethyl ether and tetrahydrofuran. Of these solvents, aromatic hydrocarbons, aliphatic hydrocarbons, alicyclic hydrocarbons, and ethers are preferable.

When the polymerization is carried out in an organic solvent, the concentration of monomers in the organic solvent is preferably from 1 to 50 wt %, more preferably from 2 to 45 wt %, and particularly preferably from 3 to 40 wt %. If the concentration of the monomers is too small, productivity is poor; if too great, viscosity of the reaction solution may be too high, resulting in difficulty in hydrogenation after the polymerization.

An activity controller may be added to the polymerization reaction mixture. An activity controller is used for stabilizing the polymerization catalyst, controlling the rate of polymerization reaction, and adjusting the molecular weight distribution of the polymer. Although there are no particular limitation to the activity controller insofar as it is an organic compound having a functional group, oxygen-containing organic compounds, nitrogen-containing organic compounds, and phosphorus-containing organic compounds are preferable. Specific examples include, but are not limited to: ethers such as diethyl ether, diisopropyl ether, dibutyl ether, anisole, furan, and tetrahydrofuran; ketones such as acetone, benzophenone, and cyclohexanone; esters such as ethyl acetate; nitriles such as acetonitrile and benzonitrile; amines such as triethylamine, triisopropylamine, quinuclidine, and N,N-diethylaniline; pyridines such as pyridine, 2,4-lutidine, 2,6-lutidine, and 2-t-butylpyridine; phosphines such as triphenylphosphine, tricyclohexylphosphine, triphenylphosphate, and trimethylphosphate; and phosphine oxides such as triphenylphosphine oxide. These activity controllers may be used either individually or in combination of two or more. The amount of the activity controller may be optionally selected from the range of 0.01 to 100 mol % of the polymerization catalyst.

In the polymerization reaction, a molecular weight regulator may be added to the reaction system in order to control the molecular weight of the polymer. As examples of the molecular weight regulator, α-olefins such as 1-butene, 1-pentene, 1-hexene, and 1-octene; aromatic vinyl compounds such as styrene and vinyltoluene; oxygen-containing vinyl compounds such as ethyl vinyl ether, isobutyl vinyl ether, allyl glycidyl ether, allyl acetate, allyl alcohol, and glycidyl methacrylate; halogen-containing vinyl compounds such as allyl chloride; nitrogen-containing vinyl compounds such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; conjugated dienes such as 1,3-butadiene, 2-methyl-1,3-butadiene, 2,3-dimethyl-1,3-butadiene, 1,3-pentadiene, and 1,3-hexadiene; and the like can be given. The amount of the molecular weight regulator can be optionally selected according to the desired molecular weight from the range of 0.1 to 50 mol % of the monomers.

Although the polymerization temperature is not specifically limited, the temperature is usually from −78° C. to 200° C., and preferably from −30° C. to 180° C. The polymerization time is also not specifically limited, but selected usually from one minute to 1000 hours according to the reaction amount.

A ring-opened polymer with a cis-isomer content of usually 80 mol % or more, and preferably 85 mol % or more, can be obtained by the above polymerization reaction as an intermediate product. Since the tacticity can be maintained in hydrogenation of the ring-opened polymer, a syndiotactic ring-opened polymer hydrogenated product with a racemo diad proportion of 51% or more, preferably 60% or more, and more preferably 70% or more, can be obtained.

<Hydrogenation Reaction>

The process for producing the ring-opened polymer hydrogenated product of the present invention further includes a step of hydrogenating carbon-carbon double bonds in the main chain of the ring-opened polymer.

The hydrogenation reaction is carried out in the presence of a hydrogenation catalyst while supplying hydrogen to the reaction system. Any hydrogenation catalyst commonly used for hydrogenation of olefins can be used without specific limitations. The following examples can be given.

As a homogeneous catalyst, a catalyst system consisting of a combination of a transition metal compound and an alkali metal compound, for example, combinations of cobalt acetate/triethylaluminum, nickel acetylacetonate/triisobutylaluminum, titanocene dichloride/n-butyllithium, zirconocene dichloride/sec-butyllithium, tetrabutoxy titanate/dimethylmagnesium, and the like can be given. Furthermore, noble-metal complex catalysts such as dichlorobis(triphenylphosphine)palladium, chlorohydridecarbonyltris(triphenylphosphine)ruthenium, chlorotris(triphenylphosphine)rhodium, and the like can be given.

As heterogeneous catalysts, solid catalysts such as nickel, palladium, platinum, rhodium, or ruthenium or catalysts comprising any of these metals carried on a carrier such as carbon, silica, diatomaceous earth, alumina, or titanium oxide, for example, combinations of nickel/silica, nickel/diatomaceous earth, nickel/alumina, palladium/carbon, palladium/silica, palladium/diatomaceous earth, palladium/alumina, and the like can be given.

The hydrogenation reaction is usually carried out in an inert organic solvent. As examples of the inert organic solvent, aromatic hydrocarbons such as benzene and toluene; aliphatic hydrocarbons such as pentane and hexane; alicyclic hydrocarbons such as cyclohexane and decahydronaphthalene; ethers such as tetrahydrofuran and ethylene glycol dimethyl ether; and the like can be given.

The inert organic solvent is usually the same solvent used in the polymerization reaction, in which case the hydrogenation may be carried out by adding hydrogenation catalyst to the polymerization solution as obtained.

The hydrogenation reaction condition varies according to the type of hydrogenation catalyst used. The hydrogenation reaction temperature is in the range usually from −20° C. to 250° C., preferably from −10° C. to 220° C., and more preferably from 0° C. to 200° C. If the hydrogenation reaction temperature is too low, the reaction speed is low; if too high, side reactions may occur. The hydrogen pressure is usually from 0.01 to 20 MPa, preferably from 0.05 to 15 MPa, and more preferably from 0.1 to 10 MPa. If the hydrogenation pressure is too low, the reaction speed is low; if too high, a high pressure resistant reaction vessel is required. Although there are no specific limitations to the reaction time, insofar as a desired hydrogenation rate is attained, the hydrogenation reaction time is usually from 0.1 to 10 hours.

The norbornene ring-opened polymer hydrogenated product of the present invention can be obtained by hydrogenating the double bonds in the main chain of the ring-opened polymer. The hydrogenation rate is preferably 70% or more, more preferably 80% or more, and particularly preferably 90% or more. The higher the hydrogenation degree, the more excellent is the heat resistance of the ring-opened polymer hydrogenated product.

The ring-opened polymer hydrogenated product obtained by the process of the present invention is normally crystalline and has a melting point (Tm). The ring-opened polymer hydrogenated product produced by the process of the present invention usually has a melting point of 150° C. or higher, and preferably 200-400° C.

EXAMPLES

The present invention will be described in more detail by Examples and Comparative Examples, which should not be construed as limiting the present invention. In the Preparation Examples, Examples, and Comparative Examples, "part(s)" means "part(s) by weight" and "%" means "wt %" unless otherwise indicated.

(1) The number average molecular weight (Mn) and weight average molecular weight (Mw) of the ring-opened polymer were determined as the polystyrene-reduced values by gel permeation chromatography using chloroform as a solvent.

(2) The isomer ratio (cis/trans ratio) of the ring-opened polymer and the hydrogenation rate of the ring-opened polymer hydrogenated product were determined by measuring the $^1$H-NMR spectrum.

(3) The proportion of the racemo diads in the ring-opened polymer hydrogenated product was determined by measuring $^{13}$C-NMR spectrum at 150° C. using ortho-dichlorobenzene-$d_4$ as a solvent and determined from the ratio of the 43.35 ppm signal originating from meso diads to the 43.43 ppm signal originating from racemo diads.

(4) The glass transition temperature (Tg), the melting point (Tm), and heat of fusion (ΔH) of the ring-opened polymer hydrogenated product were measured using a differential scanning calorimeter at a temperature increase of 10° C./min.

Preparation Example 1

A glass reaction vessel equipped with a stirrer was charged with 1.35 parts of tungsten (2,6-dimethylphenylimide)tetrachloride and 21 parts of diethyl ether. The mixture was cooled to −78° C. Then, 0.74 parts of 3,3',5,5'-tetramethyl-2,2'-biphenol dissolved in 21 parts of diethyl ether was added. The temperature was gradually increased to 0° C. and reacted for 24 hours, while maintaining the temperature at 0° C. After the reaction, diethyl ether was evaporated to obtain a dark purple red solid product.

After the addition of 13 parts of hexane and 4.2 parts of diethyl ether to the solid product, the mixture was cooled to −78° C., at which temperature, the mixture was allowed to stand for one hour to cause insoluble materials in the form of fine crystals to precipitate. The soluble portion was separated by filtration. The remaining insoluble portion was washed with 6.6 parts of hexane and the solvent was evaporated to obtain 1.84 parts of a compound (a).

$^1$H-NMR spectrum of the compound (a) measured in $C_6D_6$ was as follows.

δ ppm: 7.79 (s, 1H), 6.98 (d, 1H), 6.88 (d, 1H), 6.77 (s, 2H), 6.75 (s, 2H), 6.26 (t, 1H), 3.27 (q, 4H), 3.07 (s, 6H), 2.41 (s, 3H), 2.37 (s, 3H), 2.23 (s, 3H), 2.05 (s, 3H), 1.00 (t, 6H)

The elemental analysis of this compound (a) confirmed 46.39% of carbon, 5.07% of hydrogen, and 1.91% of nitrogen. The above results showed a good coincidence with the calculated values of the elemental composition of the compound shown by the formula (15), which are 46.40% of carbon, 5.01% of hydrogen, and 1.93% of nitrogen. As the result, the compound (a) was confirmed to have a structure shown by the formula (15).

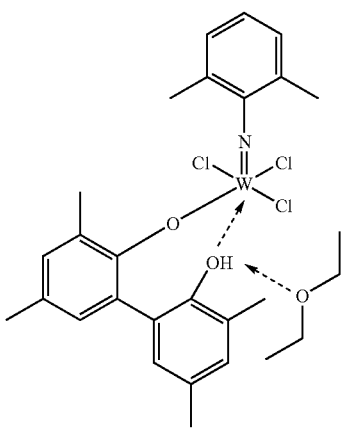

Preparation Example 2

1.34 parts of a compound (b) was obtained in the same manner as in Preparation Example 1, except for using 1.13 parts of tungsten (phenylimide)tetrachloride diethyl ether complex instead of 1.35 g of tungsten (2,6-dimethylphenylimide)tetrachloride. $^1$H-NMR spectrum of the compound (b) measured in $C_6D_6$ was as follows.

Δppm: 9.13 (s, 1H), 7.29 (s, 1H), 7.14 (s, 1H), 6.80 (d, 2H), 6.36 (t, 1H), 3.33 (q, 4H), 3.17 (s, 6H), 1.40 (s, 9H), 1.30 (s, 9H), 1.12 (t, 6H)

The elemental analysis of this compound (a) confirmed 44.91% of carbon, 4.61% of hydrogen, and 2.05% of nitrogen. The above results showed a good coincidence with the calculated values of elemental composition of the compound shown by the formula (16), which are 44.82% of carbon, 4.63% of hydrogen, and 2.01% of nitrogen. As the result, the compound (b) was confirmed to have a structure shown by the formula (16).

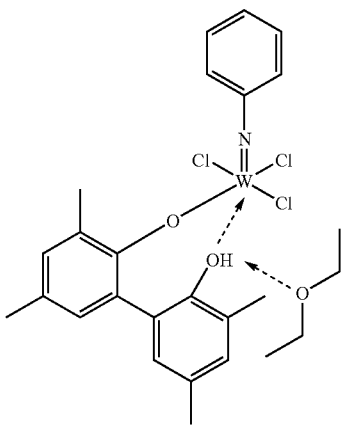

Example 1

A glass reaction vessel equipped with a stirrer was charged with 0.082 part of the compound (a) obtained in Preparation Example 1, as a polymerization catalyst, and 3.5 parts of toluene. The mixture was cooled to −78° C. A solution of 0.027 part of diethylaluminum chloride dissolved in 0.87 part of toluene was further added. After allowing the temperature to increase up to 0° C., the mixture was reacted for one hour. Then, 7.5 parts of dicyclopentadiene, 23 parts of toluene, and 0.65 part of 1-octene were added, and the mixture was polymerized at 0° C. The viscosity of the solution gradually increased after start of the polymerization reaction. After 24 hours, a large amount of methanol was added to the polymerization reaction solution to produce precipitate, which was collected by filtration, washed, and dried at 40° C. for 24 hours under reduced pressure. The resulting ring-opened polymer (1) was obtained in an yield of 7.4 parts and had Mn of 42,000 and Mw of 210,000. The cis/trans ratio of main chain carbon-carbon double bonds of the ring-opened polymer was 93/7.

An autoclave equipped with a stirrer was charged with 3 parts of the ring-opened polymer (1) obtained above and 47 parts of cyclohexane. Next, a hydrogenation catalyst solution of 0.0187 part of bis(tricyclohexylphosphine)benzylidineruthenium (IV) dichloride and 0.45 part of ethyl vinyl ether dissolved in 7.8 parts of cyclohexane was added. Hydrogenation reaction was carried out at a hydrogen pressure of 0.8 MPa at 160° C. for eight hours. The reaction solution was poured into a large amount of isopropanol to completely precipitate the polymer, which was collected by filtration, washed, and dried at 40° C. for 24 hours under reduced pressure to obtain a ring-opened polymer hydrogenated product (1). In $^1$H-NMR spectrum measurement, no peaks originating from carbon-carbon double bonds were found and the hydrogenation rate was 99% or more. The proportion of racemo diads in the ring-opened polymer hydrogenated product (1) was 68%. The melting point (Tm) was 270° C. and heat of fusion (ΔH) was 49 J/g.

Example 2

7.1 parts of a ring-opened polymer (2) was obtained in the same manner as in Example 1, except for using 0.079 part of compound (b) obtained in Preparation Example 2 as the polymerization catalyst instead of 0.082 part of the compound (a). The ring-opened polymer (2) obtained had Mn of 8,100 and Mw of 25,000. The cis/trans ratio of main chain carbon-carbon double bonds of the ring-opened polymer was 92/8.

A ring-opened polymer hydrogenated product (2) was obtained in the same manner as in Example 1 except for using 3 parts of the ring-opened polymer (2) obtained in the above. In $^1$H-NMR spectrum measurement, no peaks originating from carbon-carbon double bonds were found and the hydrogenation rate was 99% or more. The proportion of racemo diads in the ring-opened polymer hydrogenated product (2) was 80%. The melting point (Tm) was 271° C. and heat of fusion (ΔH) was 49 J/g.

Example 3

A glass reaction vessel equipped with a stirrer was charged with 0.06 part of tungsten (phenylimide)tetrachloride diethyl ether (hereinafter referred to as "compound (c)"), as a polymerization catalyst, and one part of cyclohexane. A solution of 0.047 part of diethylaluminum ethoxide dissolved in 0.5 part of hexane was further added and the mixture was reacted at room temperature for 30 minutes. Then, 7.5 parts of dicyclopentadiene, 27 parts of cyclohexane, and 0.3 part of 1-octene were added, and the mixture was polymerized at 50° C. The viscosity of the solution gradually increased after start of the polymerization reaction. After three hours, a large amount of isopropyl alcohol was added to the polymerization reaction solution to produce precipitate, which was collected by filtration, washed, and dried at 40° C. for 24 hours under reduced pressure. The resulting ring-opened polymer (3) was obtained in a yield of 7.4 parts and had Mn of 21,000 and Mw of 90,300. The cis/trans ratio of main chain carbon-carbon double bonds of the ring-opened polymer was 93/7.

A ring-opened polymer hydrogenated product (3) was obtained in the same manner as in Example 1, except for using 3 parts of the ring-opened polymer (3) obtained in the above instead of 3 parts of the ring-opened polymer (1). In $^1$H-NMR spectrum measurement, no peaks originating from carbon-carbon double bonds were found and the hydrogenation rate was 99% or more. The proportion of racemo diads in the ring-opened polymer hydrogenated product (3) was 80%. The melting point (Tm) was 272° C. and heat of fusion (ΔH) was 51 J/g.

Example 4

7.2 parts of a ring-opened polymer (4) was obtained in the same manner as in Example 3, except for using 0.054 part of tungsten (ethylimide)tetrachloride diethyl ether (hereinafter referred to as "compound (d)"), as a polymerization catalyst, instead of 0.06 part of the compound (c). The ring-opened polymer (4) obtained had Mn of 7,600 and Mw of 31,900. The cis/trans ratio of main chain carbon-carbon double bonds of the ring-opened polymer was 89/11.

Then, the ring-opened polymer was hydrogenated in the same manner as in Example 3 to obtain a ring-opened polymer hydrogenated product (4). In $^1$H-NMR spectrum measurement, no peaks originating from carbon-carbon double bonds were found and the hydrogenation rate was 99% or more. The proportion of racemo diads in the ring-opened polymer hydrogenated product (4) was 80%. The melting point (Tm) was 270° C. and heat of fusion (ΔH) was 37 J/g.

Example 5

7.2 parts of a ring-opened polymer (5) was obtained in the same manner as in Example 3, except for using 0.061 part of tungsten (n-hexylimide)tetrachloride diethyl ether (hereinafter referred to as "compound (e)") instead of 0.06 part of the compound (c). The ring-opened polymer (5) obtained had Mn of 9,400 and Mw of 39,500. The cis/trans ratio of main chain carbon-carbon double bonds of the ring-opened polymer was 86/14.

Then, the ring-opened polymer was hydrogenated in the same manner as in Example 3 to obtain a ring-opened polymer hydrogenated product (5). In $^1$H-NMR spectrum measurement, no peaks originating from carbon-carbon double bonds were found and the hydrogenation rate was 99% or more. The proportion of racemo diads in the ring-opened polymer hydrogenated product (5) was 70%. The melting point (Tm) was 260° C. and heat of fusion (ΔH) was 22 J/g.

Comparative Example 1

7.4 parts of a ring-opened polymer (6) was obtained in the same manner as in Example 3, except for using 0.05 part of tungsten oxytetrachloride diethyl ether (hereinafter referred to as "compound (f)"), as a polymerization catalyst, instead of 0.06 part of the compound (c). The ring-opened polymer (6) obtained had Mn of 5,200 and Mw of 26,100. The cis/trans ratio of main chain carbon-carbon double bonds of the ring-opened polymer was 80/20.

Then, the ring-opened polymer was hydrogenated in the same manner as in Example 3 to obtain a ring-opened polymer hydrogenated product (6). In $^1$H-NMR spectrum measurement, no peaks originating from carbon-carbon double bonds were found and the hydrogenation rate was 99% or more. The proportion of racemo diads in the ring-opened polymer hydrogenated product (6) was 50%. The melting point (Tm) was not observed, but the glass transition temperature (Tg) was observed at 98° C.

Comparative Example 2

6.8 parts of a ring-opened polymer (7) was obtained in the same manner as in Example 3, except for using 0.064 part of tungsten (2,6-diisopropylphenylimide)tetrachloride diethyl ether (hereinafter referred to as "compound (g)"), as a polymerization catalyst, instead of 0.06 part of the compound (c). The ring-opened polymer (7) obtained had Mn of 16,000 and Mw of 49,600. The cis/trans ratio of main chain carbon-carbon double bonds of the ring-opened polymer was 78/22.

Then, the ring-opened polymer was hydrogenated in the same manner as in Example 3 to obtain a ring-opened polymer hydrogenated product (7). In $^1$H-NMR spectrum measurement, no peaks originating from carbon-carbon double bonds were found and the hydrogenation rate was 99% or more. The proportion of racemo diads in the ring-opened polymer hydrogenated product (7) was 50%. The melting point (Tm) was not observed, but the glass transition temperature (Tg) was observed at 100° C.

The results of the above experiments are shown in Table 1. As clear from the Table 1, the ring-opened polymer hydrogenated products of Examples 1 to 5 having a racemo diad proportion of 51% or more are crystalline polymers having a melting point (Tm). In addition, it can be seen that the ring-opened polymer hydrogenated products of Examples 1 to 5 have a high heat of fusion at a high melting point of about 260° C. or more and thus have high heat resistance. In contrast, the ring-opened polymer hydrogenated products having a racemo diad proportion of 50% were non-crystalline polymers having no melting point. These polymers have a glass transition temperature of 98-100° C., indicating low heat resistance (Comparative Examples 1 and 2).

TABLE 1

|  | Example 1 | Example 2 | Example 3 |
|---|---|---|---|
| Ring-opened polymer | 1 | 2 | 3 |
| Catalyst | Compound (a) | Compound (b) | Compound (c) |
| Mn | 42,000 | 8,100 | 21,000 |
| Mw | 210,000 | 25,000 | 90,300 |
| cis/trans ratio | 92/8 | 92/8 | 92/7 |
| Ring-opened polymer hydrogenated product | 1 | 2 | 3 |
| Percentage of racemo diad (%) | 68 | 80 | 80 |
| Tm (° C.) | 270 | 271 | 272 |
| Tg (° C.) | — | — | — |
| ΔH (J/g) | 49 | 49 | 51 |

TABLE 2

|  | Example 4 | Example 5 | Comparative Example 1 | Comparative Example 2 |
|---|---|---|---|---|
| Ring-opened polymer | 4 | 5 | 6 | 7 |
| Catalyst | Compound (d) | Compound (e) | Compound (f) | Compound (g) |
| Mn | 7,600 | 9,400 | 5,200 | 16,000 |
| Mw | 31,900 | 39,500 | 26,100 | 49,600 |

TABLE 2-continued

| | Example 4 | Example 5 | Comparative Example 1 | Comparative Example 2 |
|---|---|---|---|---|
| cis/trans ratio | 89/11 | 86/14 | 80/20 | 78/22 |
| Ring-opened polymer hydrogenated product | 4 | 5 | 6 | 7 |
| Percentage of racemo diad (%) | 80 | 70 | 50 | 50 |
| Tm (° C.) | 270 | 260 | — | — |
| Tg (° C.) | — | — | 98 | 100 |
| ΔH (J/g) | 37 | 22 | — | — |

INDUSTRIAL APPLICABILITY

According to the present invention, a novel norbornene ring-opened polymer hydrogenated product containing a repeating unit originating from a polycyclic norbornene monomer having three or more rings, having a weight average molecular weight in a specific range, and having a syndiotactic structure can be obtained. Since the ring-opened polymer hydrogenated product is a crystalline polymer and excels in heat resistance, the polymer is suitably used as a material for forming products and films with various applications.

The invention claimed is:

1. A ring-opened polymer hydrogenated product containing a repeating unit originating from a polycyclic norbornene monomer with three or more rings in the polymer repeating units, having a weight average molecular weight of 25,000 to 1,000,000, and having a racemo diad proportion of 70% or more.

2. The ring-opened polymer hydrogenated product according to claim 1, wherein the content of the repeating unit originating from a polycyclic norbornene monomer with three or more rings is 50 mol % or more.

3. The ring-opened polymer hydrogenated product according to claim 1, wherein the repeating unit originating from a polycyclic norbornene monomer with three or more rings is a repeating unit originating from dicyclopentadiene.

4. The ring-opened polymer hydrogenated product according to claim 1, which is a crystalline polymer.

5. The ring-opened polymer hydrogenated product according to claim 4, which is a polymer having a melting point of 150° C. or more.

6. A process for producing the ring-opened polymer hydrogenated product according to claim 1, comprising a step of polymerizing a polycyclic norbornene monomer having three or more rings by solution polymerization using a compound shown by the following formula (a) as a polymerization catalyst to obtain a ring-opened polymer and a step of hydrogenating double bonds in the main chain of the ring-opened polymer, $$M(NR^a)X_3Y.L_b \quad (a)$$

wherein M is tungsten, $R^a$ is a substituted or unsubstituted phenyl group with a substituent at any of 3, 4, or 5 position or a group represented by $CH_2R^d$, wherein $R^d$ indicates a hydrogen atom, a substituted or unsubstituted alkyl group, or a substituted or unsubstituted aryl group, X represents a halogen atom; alkyl group, aryl group, or alkylsilyl group, Y is a hydroxyl group-containing aryloxy group or a hydroxyl group-containing alkoxyl group, L is an electron donating neutral ligand, and b is an integer of 0 to 2.

7. A process for producing the ring-opened polymer hydrogenated product according to claim 1, comprising a step of polymerizing a polycyclic norbornene monomer having three or more rings by solution polymerization using a compound shown by the following formula (b) as a polymerization catalyst to obtain a ring-opened polymer and a step of hydrogenating double bonds in the main chain of the ring-opened polymer, $$M(NR^b)X_{4-a}(OR^c)_a.L_b \quad (b)$$

wherein M is tungsten, $R^b$ is a substituted or unsubstituted phenyl group with a substituent at any of 3, 4, or 5 position or a group represented by $CH_2R^d$, wherein $R^d$ indicates a hydrogen atom, a substituted or unsubstituted alkyl group, or a substituted or unsubstituted aryl group, X represents a halogen atom, alkyl group, aryl group, or alkylsilyl group, $R^c$ is a substituted or unsubstituted alkyl group or a substituted or unsubstituted aryl group, L is an electron donating neutral ligand, a is 0 or 1, and b is an integer of 0 to 2.

* * * * *